(No Model.)
A. S. HICKLEY.
PROCESS OF MANUFACTURING AMALGAMS BY ELECTROLYSIS.
No. 356,640. Patented Jan. 25, 1887.
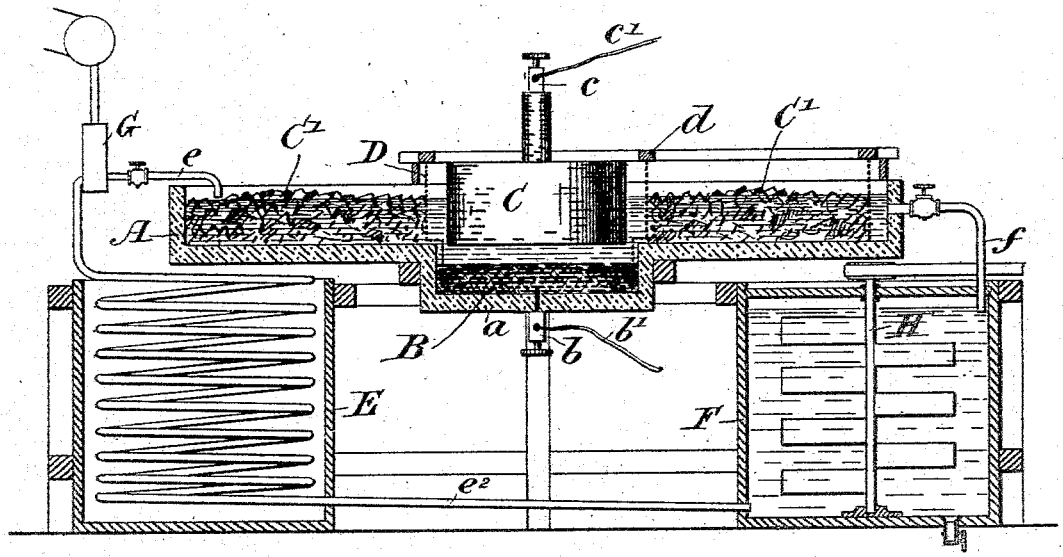

United States Patent Office.

ARTHUR S. HICKLEY, OF MONTREAL, QUEBEC, CANADA, ASSIGNOR, BY MESNE ASSIGNMENTS, TO THE ELECTRIC AMALGAM COMPANY, OF MAINE.

PROCESS OF MANUFACTURING AMALGAMS BY ELECTROLYSIS.

SPECIFICATION forming part of Letters Patent No. 356,640, dated January 25, 1887.

Application filed August 13, 1884. Serial No. 140,405. (No model.)

*To all whom it may concern:*

Be it known that I, ARTHUR SAMUEL HICKLEY, of the city of Montreal, in the District of Montreal and Province of Quebec, in the Dominion of Canada, have invented a certain new and useful Improved Process of Manufacturing Amalgams by Electrolysis; and I do hereby declare that the following is a full, clear, and exact description of the same.

This invention relates to the manufacture of amalgams by the use of an electric current in a battery-cell, and is intended, mainly, to produce that class of amalgam which may be used in batteries to give off electro-motive force.

As I have already demonstrated in a secondary battery the practical utility of an amalgam of mercury and sodium as an element giving off a large amount of electro-motive force, I shall only describe my improved process with special reference to the manufacture of this amalgam, as it will be apparent to those skilled in the art that zinc and other metals may be combined with mercury in the same manner.

The accompanying drawing represents a longitudinal section of an apparatus suitable for carrying out my process. The letters marked thereon and those used in the following description indicate like parts.

A represents a large flat cell, made of glass, glazed earthenware, or other suitable material, and preferably deeper in the center than at the sides and ends, as shown at $a$. This deep portion contains a body of mercury, B, which acts as the cathode of the battery.

Above the mercury, and at the proper distance therefrom, is placed a body or block of carbon, C, (supported by any convenient means and arranged to be removable,) which acts as the anode. A screen or sieve, D, of suitable material and texture and made in the form of a box, is placed loosely in the mercury-receptacle, its bottom resting on the bottom of the deep portion $a$ of the cell, and its sides extending above the sides of the cell, where they are provided with a suitable frame-work, $d$.

$b$ shows the binding-post in connection with the mercury-electrode, and $c$ that attached to the carbon electrode. The wires $b'$ $c'$ lead to the dynamo-electric machine.

In the cell A, on both sides of the electrodes B and C, but separated therefrom by the screen D, I preferably place broken lumps of carbon, C' C', which really form supplementary anodes, and into the cell I introduce an electrolytic fluid, (in this case chloride of sodium,) which flows continuously from a pipe through the cell A, the supply being maintained by pumping or siphoning from a vat, E, containing a coil of pipes, $e'$, connected by a pipe, $e^2$, to another vat, F, in which the brine is made. I have shown in diagram a pump, G, connected to the pipe $e$ for raising the fluid, and have also indicated a revolving shaft, H, with paddles or agitators in the vat F, for assisting in the mixture of the salt and water. The fluid is discharged from the cell A through a pipe, $f$, connecting the end of the cell A to the vat F, where it acquires fresh strength before being returned.

From the above it will be seen that a continuous flow of brine or chloride of sodium is kept up between the electrodes, and by the action of the electric current brought in through the positive wire $b'$ the water of the electrolyte is decomposed and sodium in metallic form is precipitated into the mercury, and forms an amalgam therewith in the manner fully set forth in my former applications for patents on secondary batteries.

The continuous flow of the electrolyte enables me to supply a very large quantity of sodium continuously to the body of mercury, and in this manner make a very rich amalgam.

When the amalgam of sodium and mercury is of the required consistency to be formed into lumps or cakes, it is removed from the cell A by lifting out the carbon electrode C, and then raising the screen or strainer D, which will carry the amalgam with it, but allowing the surplus mercury to remain in the cell A. The thick amalgam thus obtained may be subjected to pressure to remove any superfluous mercury or moisture, and then packed in airtight vessels for future use.

The amalgam thus formed is particularly valuable for both primary and secondary batteries. For instance, in a primary battery made up of two electrodes of carbon and mercury and an electrolyte of an alkaline metal—such as sodium in solution—a quantity of the amalgam is introduced into the mercury. The amalgam instantly combines with the mercury, and the sodium combines, chemically, with the electrolyte, so as to form caustic soda, and a current of electricity passes from the mercury-electrode through the electrolyte to the carbon and from the carbon through the external circuit back to the mercury.

In a secondary battery made of the same elements, and such as described in my former patents, a quantity of the sodium and mercury amalgam produced by my present process can be placed in the mercury-electrode by any suitable means and the strength of the storage-battery materially increased.

I am aware that it is not new to deposit a metallic salt by electrolysis upon a body of mercury which forms the cathode of a battery having a carbon anode; but so far as I am aware a prescribed quantity of the electrolytic fluid is used in a state of rest or in an independent vessel from that which contains the mercury, whereas in my process a continuous circulation of the electrolyte is maintained directly through the main receptacle.

What I claim, and desire to secure by Letters Patent, is as follows:

The method of producing amalgams, which consists in decomposing an electrolytic metallic solution continuously circulating in a current between an anode of carbon and a cathode of mercury by means of an electric current, and thereby depositing the metallic salt upon the mercury.

Boston, June 4, 1884.

ARTHUR S. HICKLEY.

Witnesses:
  W. S. HILL,
  PRESTON WARE, Jr.